United States Patent [19]

Hoffmann et al.

[11] Patent Number: 4,463,189

[45] Date of Patent: Jul. 31, 1984

[54] STABILIZATION OF POLYETHER OR POLYESTER MOLDING COMPOSITIONS AGAINST PREMATURE REACTION

[75] Inventors: Bernd Hoffmann, Frankfurt am Main; Klaus-Jürgen Behme, Eppstein, both of Fed. Rep. of Germany

[73] Assignee: Hoechst Aktiengesellschaft, Frankfurt am Main, Fed. Rep. of Germany

[21] Appl. No.: 420,938

[22] Filed: Sep. 21, 1982

[30] Foreign Application Priority Data

Oct. 3, 1981 [DE] Fed. Rep. of Germany ....... 3139401

[51] Int. Cl.$^3$ .............................................. C07C 85/26
[52] U.S. Cl. ...................................... 564/2; 252/182; 252/403
[58] Field of Search ...................... 564/2; 252/182, 403

[56] References Cited

FOREIGN PATENT DOCUMENTS 1207626 12/1964 Fed. Rep. of Germany.
1618291 6/1967 Fed. Rep. of Germany.

OTHER PUBLICATIONS

Suehiro et al., CA 73:36079d, (1970).

*Primary Examiner*—Thomas A. Waltz
*Attorney, Agent, or Firm*—Berman, Aisenberg & Platt

[57] ABSTRACT

Mixtures which are used for the production of polyurethane foam and which contain amines having primary or secondary aliphatic hydroxyl groups, and also customary quantities of trichlorotrifluoroethane and/or trichlorofluoromethane as a blowing agent, can be stabilized against the premature reaction of the components by adding 0.05 to 5% by weight of 2,4-diphenyl-4-methylpentene in which the ratio of the 2,4-diphenyl-4-methyl-1-pentene isomer to the 2,4-diphenyl-4-methyl-2-pentene isomer is 1:1 to 9:1, the percentages relating to the chlorofluoroalkane. In particular, these mixtures can be stabilized by adding 0.1 to 5% by weight of a mixture consisting of 45 to 89% by weight of 2,4-diphenyl-4-methyl-1-pentene, 10 to 45% by weight of 2,4-diphenyl-4-methyl-2-pentene and 1 to 20% by weight of 1,1,3-trimethyl-3-phenylindane.

7 Claims, No Drawings

STABILIZATION OF POLYETHER OR POLYESTER MOLDING COMPOSITIONS AGAINST PREMATURE REACTION

The invention relates to the use of a new stabilizer combination for stabilizing mixtures used for the production of polyurethane foam.

Chlorofluoroalkanes are used on a large scale as blowing agents in connection with polyesters or polyethers which are reacted with polyfunctional isocyanates to give polyurethane foams. The polyester or polyether compositions employed are mixtures composed of compounds containing active hydrogen, principally polyols and aminopolyols, which can also contain low-molecular components, such as for example, amines and amine-alcohols (as a catalyst). In practice, the first step is to mix the compounds containing active hydrogen and to add catalysts, surface-active agents, flame-retarding additives and water. Only when it is at the place of use is this mixture combined and reacted with the polyisocyanate in order to produce the polyurethane foam. It is sometimes necessary, therefore, to keep these foam systems stable on storage over several months. However, it has been found that the amino compounds containing hydroxyl groups react with chlorofluoroalkanes, in particular trichlorofluoromethane and trichlorotrifluoroethane, with the elimination of hydrogen chloride and the formation of an aldehyde and a chlorofluoroalkane containing hydrogen. Such products result in discoloration and, occasionally, in the formation of crystalline precipitates in the foamable mixture, and also interfere with the foaming reaction.

It is known from German Pat. No. 1,207,626 that unsaturated compounds, such as, for example butadiene, isoprene, styrene, α-methylstyrene or 1-alkenes having 4 to 18 carbon atoms, can be employed as stabilizers for foamable compositions of this type. Closely related olefinic compounds, such as, for example 2-butene, vinyl acetate or methyl vinyl ketone are ineffective or virtually ineffective for the same purpose (column 1, lines 33–39). It is known from German Pat. No. 1,618,291 that p-isopropenyltoluene (=p-methyl-α-methylstyrene) is also capable of inhibiting the reaction of the polyol containing amino groups with the chlorofluoroalkane.

It is a disadvantage that the substances suggested have a relatively low flash point. The regulations on combustible liquids require in some countries compulsory labeling of a material having a flash point lower than 100° C. Substances of this type must be handled with particular caution when being incorporated on an industrial scale. Some of the known stabilizers are dangerous from a toxicological point of view. Finally, there is a risk of these substances polymerizing as a result of various influences, which can take place before or after they have been incorporated into the foamable system.

There was therefore a need to find a new stabilizer system which does not have these disadvantages.

It has now been found that additions of 0.05 to 5% by weight (relative to the weight of the chlorofluoroalkane) of 2,4-diphenyl-4-methylpentene to mixtures containing amines having primary or secondary aliphatic hydroxyl groups, and also customary quantities of trichlorotrifluoroethane or trichlorofluoromethane as the blowing agent, are suitable for suppressing the premature reaction of the components. The 2,4-diphenyl-4-methylpentene referred to is composed of the two isomers 2,4-diphenyl-4-methyl-1-pentene and 2,4-diphenyl-4-methyl-2-pentene. The ratio of the isomers 1-pentene/2-pentene is, in particular, 1:1 to 9:1. The trichlorotrifluoroethane used as the blowing agent has the formula $CF_2Cl\text{-}CCl_2F$.

Instead of the mixture of the two pentenes, it is also possible to employ a technical mixture, which, as well as these two components, also contains a small proportion of 1,1,3-trimethyl-3-phenylindane. A mixture of this type can be obtained, for example, by the process of U.S. Pat. No. 2,429,719, and generally contains 45 to 89% by weight of 2,4-diphenyl-4-methyl-1-pentene, 10 to 45% by weight of 2,4-diphenyl-4-methyl-2-pentene and 1 to 20% by weight of 1,1,3-trimethyl-3-phenylindane.

Ranges of composition which are particularly preferred are 50 to 60, especially 55 to 65, % by weight of the 1-pentene, 20 to 40, especially 25 to 35, % by weight of the 2-pentene and 5 to 15% by weight of the indane derivative.

The stabilizer mixture is a colorless, virtually odorless neutral liquid with a viscosity of approx. 20 mPa.s (at 20° C.). It is not spontaneously inflammable, is not an explosive hazard, is not sensitive to light and has no tendency to polymerize. Its flash point is 120° C., so that the stabilizer no longer has to be allocated to a risk category under the German Regulations on Flammable Liquids (VbF).

The stabilizer is miscible in all proportions with the chlorofluoroalkanes mentioned and can thus be incorporated without difficulty, at a low concentration, into trichlorofluoromethane or trichlorotrifluoroethane. Good solubility in the other foaming components is also provided. The stabilizer prevents the decomposition of aminoalcohols containing one hydroxyl group and, in particular, those containing several hydroxyl groups.

It is surprising that the substance suggested is suitable for preventing or retarding the decomposition of chlorofluoroalkanes in the presence of aminoalcohols. A further advantage of the inhibitor mixture according to the invention is its oily consistency and its good stability. Chlorofluoroalkanes are often metered into the other components by means of reciprocating pumps, and in these cases would have to contain a lubricant, for example dioctyl phthalate. Since the stabilizer acts as a lubricant, it can also fulfil this requirement at the same time.

The invention is illustrated in greater detail by the following examples.

EXAMPLE 1

Varying quantities of different stabilizers were added to mixtures composed of 90% by weight of triethanolamine and 10% by weight of trichlorofluoromethane, and the mixtures were stored at 40° C. for varying times. The results of the storage tests are shown in Table I. The stabilizer used in accordance with the invention in test 2 had the following composition.

- approx. 60% by weight of 2,4-diphenyl-4-methyl-1-pentene,
- approx. 30% by weight of 2,4-diphenyl-4-methyl-2-pentene and
- approx. 10% by weight of 1,1,3-trimethyl-3-phenylindane.

The olefinic compounds employed as comparison stabilizers in the other tests are taken from the patent literature. The quantity of cleavage products (dichlorofluoromethane and hydrogen chloride) is quoted in percent by weight (relative to the total mixture). The expression "n.d." denotes that in this case the quantity of cleavage products was not determined.

It can be seen from the table that related compounds differ greatly in their suitability and can evn be completely unsuitable.

The tests were carried out by weighing 50 g of each mixture into aerosol glass bottles and immediately closing these in a gastight manner. After the time indicated, the optical appearance of the mixtures was assessed and, if necessary the mixtures were analysed for possible cleavage products.

EXAMPLE 2

Mixtures of 10% by weight of trichlorofluoromethane and 90% by weight of a polyol C having the composition which follows were investigated at 40° C. (Polyol system C for polyurethane rigid foam)

50 parts by weight of oxypropylated trimethylolpropane having a hydroxyl number of 380
40 parts by weight of oxypropylated ethylenediamine having a hydroxyl number of 450
10 parts by weight of triethanolamine
0.8 part by weight of water
1.5 parts by weight of a commerical polysiloxane
1.0 part by weight of triethylamine and
0.7 part by weight of methyl bis-dimethylaminoethylamine.

The stabilizer used in accordance with the invention in test 13 has the same composition as in test 2 of Example 1. The result of the tests is shown in Table II.

EXAMPLE 3

The behavior of mixtures composed of 95% by weight of trichlorofluoromethane and 5% by weight of inhibitor at 50° C. (in the absence of an amine containing hydroxyl groups) was investigated. The results are shown in Table III. It was found that α-methylstyrene mixed with trichlorofluoromethane forms a white, flocculent precipitate after being stored for a short time. This precipitate can be redissolved in the trichlorofluoromethane by shaking vigorously; however, this white polymer is reprecipitated if this solution is used in accordance with the procedure, i.e. if it is mixed with a polyol system, and the precipitate does not redissolve even when shaken vigorously. The stabilizer system to be employed in accordance with the invention does not have this disadvantage.

EXAMPLE 4

Mixtures of various polyols (90% by weight) and 10% by weight of trichlorofluoromethane were stored at 30° C. for 90 days, and the appearance of the mixture was then assessed. The result is shown in Table IV. Column 3 ("stabilizer") indicates the quantity (% by weight relative to trichlorofluoromethane) of the stabilizer mentioned in Example 1, test 2. Polyol B was an oxypropylated ethylenediamine having a hydroxyl number of 450. Polyol D was a polyol system for polyurethane cold-molded foam and had the following composition:

100 parts by weight of a glycerol/propylene oxide/ethylene oxide addition compound having a hydroxyl number of 35 and predominantly primary hydroxyl groups,
2 parts by weight of triethanolamine,
3 parts by weight of water,
0.5 part by weight of a polysiloxane foam stabilizer,
0.5 part by weight of dimethylaminoethanol and
0.8 part by weight of triethylenediamine, dissolved in dipropylene glycol (33% strength).

The tests demonstrated the good effectiveness in the presence of trichlorofluoromethane of the stabilizer system to be employed in accordance with the invention.

EXAMPLE 5

A mixture composed of 90% by weight of triethanolamine and 10% by weight of 1,1,2-trichloro-1,2,2-trifluoroethane was stored at 30° C. for 90 days. The results are shown in Table V. Column 2 indicates the quantity of stabilizer from Example 1, test 2 (in % by weight, relative to $C_2Cl_3F_3$). It can be seen that this stabilizer is also effective in the presence of trichlorotrifluoroethane.

EXAMPLE 6

Mixtures composed of 50% by weight of the catalyst dimethylaminoethanol used in Example 4 and 50% by weight of trichlorofluoromethane were stored at 30° C., with and without stabilizer, for up to 180 days. The results are shown in Table VI. It can be seen that this stabilizer also prevents the premature reaction of the halogenated hydrocarbon with an amine containing only one single hydroxyl group.

TABLE I

| Test | Storage time, days | Inhibitor, 1% on $CCl_3F$ | Appearance of the mixture | Cleavage products % of $CHCl_2F$ | % of HCl |
|---|---|---|---|---|---|
| 1 | 4 | none | brown, pasty | 1.6 | 0.34 |
| 2 | 1 | 2,4-Diphenyl-4-methylpentene | bright, clear | 0.05 | 0.02 |
|   | 4 | 2,4-Diphenyl-4-methylpentene | " | n.d. | n.d. |
|   | 10 | 2,4-Diphenyl-4-methylpentene | " | n.d. | n.d. |
|   | 18 | 2,4-Diphenyl-4-methylpentene | yellow, cloudy | 0.05 | 0.04 |
|   | 30 | 2,4-Diphenyl-4-methylpentene | yellow, cloudy | 0.07 | 0.06 |
| 4 | 1 | α-Methylstyrene | bright, clear | n.d. | n.d. |
|   | 4 | αMethylstyrene | " | n.d. | n.d. |
|   | 10 | α-Methylstyrene | " | n.d. | n.d. |
|   | 18 | αMethylstyrene | yellow, cloudy | n.d. | n.d. |
|   | 30 | α-Methylstyrene | yellow, cloudy | 0.05 | 0.04 |
| 5 | 1 | Camphene | bright, clear | n.d. | n.d. |
|   | 4 | " | " | n.d. | n.d. |
|   | 10 | " | yellow, clear | n.d. | n.d. |
|   | 18 | " | brown, cloudy | n.d. | n.d. |
|   | 30 | " | brown, cloudy | 0.2 | 0.11 |
| 6 | 1 | Dicyclopentadiene | bright, clear | n.d. | n.d. |
|   | 4 | Dicyclopentadiene | yellow, clear | n.d. | n.d. |
|   | 10 | Dicyclopentadiene | brown, cloudy | n.d. | n.d. |
|   | 18 | Dicyclopentadiene | brown, cloudy | n.d. | n.d. |
|   | 30 | Dicyclopentadiene | brown, pasty | 0.4 | 0.21 |

TABLE I-continued

| Test | Storage time, days | Inhibitor, 1% on CCl$_3$F | Appearance of the mixture | Cleavage products % of CHCl$_2$F | % of HCl |
|---|---|---|---|---|---|
| 7 | 1 | Stilbene | bright, clear | n.d. | n.d. |
|  | 4 | " | yellow, clear | n.d. | n.d. |
|  | 10 | " | brown, cloudy | n.d. | n.d. |
|  | 18 | " | brown, pasty | n.d. | n.d. |
|  | 30 | " | brown, pasty | 1.0 | 0.38 |
| 8 | 1 | 2,4,4-Trimethyl-1-pentene | bright, clear, | n.d. | n.d. |
|  | 4 | 2,4,4-Trimethyl-1-pentene | yellow, clear | n.d. | n.d. |
|  | 10 | 2,4,4-Trimethyl-1-pentene | brown, pasty | n.d. | n.d. |
|  | 18 | 2,4,4-Trimethyl-1-pentene | brown, pasty | n.d. | n.d. |
|  | 30 | 2,4,4-Trimethyl-1-pentene | brown, pasty | 1.6 | 0.34 |
| 9 | 4 | Hexafluoropropene | brown, pasty | n.d. | n.d. |
| 10 | 4 | Morpholinocyclohex-1-ene | brown, pasty | n.d. | n.d. |
| 11 | 30 | Acrylonitrile | brown, cloudy | 1.1 | 0.36 |

TABLE II

| Test | Storage time, days | Inhibitor, 1% on CCl$_3$F | Appearance of the mixture | Cleavage products % of CHCl$_2$F | % of HCl |
|---|---|---|---|---|---|
| 12 | 1 | none | brown, clear | 0.1 | 0.06 |
|  | 3 | " | brown, cloudy | 0.3 | 0.15 |
|  | 10 | " | black, pasty | 0.7 | 0.30 |
| 13 | 1 | 2,4-Diphenyl-4-methylpentene | bright, clear | n.d. | n.d. |
|  | 3 | 2,4-Diphenyl-4-methylpentene | yellow, clear | 0.05 | 0.02 |
|  | 10 | 2,4-Diphenyl-4-methylpentene | yellow, clear | n.d. | n.d. |
|  | 16 | 2,4-Diphenyl-4-methylpentene | yellow clear | n.d. | n.d. |
|  | 30 | 2,4-Diphenyl-4-methylpentene | brown, clear | 0.11 | 0.07 |
| 14 | 1 | α-Methylstyrene | bright, clear | n.d. | n.d. |
|  | 3 | α-Methylstyrene | yellow, cloudy | 0.05 | 0.02 |
|  | 10 | α-Methylstyrene | yellow, cloudy | n.d. | n.d. |
|  | 16 | α-Methylstyrene | yellow, cloudy | n.d. | n.d. |
|  | 30 | α-Methylstyrene | brown, cloudy | 0.10 | 0.06 |

TABLE III

| Test | Storage time, days | Inhibitor | Appearance of the mixture |
|---|---|---|---|
| 15 | 1 | α-Methylstyrene | no result |
|  | 7 | " | white, flocculent precipitate |
| 16 | 7 | 2,4-Diphenyl-4-methylpentene | bright, clear |
|  | 30 | 2,4-Diphenyl-4-methylpentene | " |
|  | 90 | 2,4-Diphenyl-4-methylpentene | " |
|  | 180 | 2,4-Diphenyl-4-methylpentene | " |

TABLE IV

| Test | Polyol | Stabilizer, % | Appearance of the mixture | Cleavage products % of CHCl$_2$F | % of HCl |
|---|---|---|---|---|---|
| 17 | Triethanolamine | 0 | brown, pasty | 6.0 | 2.0 |
| 18 | Triethanolamine | 0.05 | " | n.d. | n.d. |
| 19 | Triethanolamine | 0.25 | brown, clear | 0.2 | 0.12 |
| 20 | Triethanolamine | 0.5 | yellow, clear | 0.1 | 0.07 |
| 21 | Triethanolamine | 1 | " | 0.1 | 0.05 |
| 22 | Triethanolamine | 3 | bright, clear | 0.05 | 0.02 |
| 23 | Triethanolamine | 5 | " | n.d. | n.d. |
| 24 | B | 0 | brown, clear | 1.1 | 0.70 |
| 25 | B | 0.5 | yellow, clear | 0.1 | 0.08 |
| 26 | B | 1 | " | 0.1 | 0.06 |
| 27 | B | 2 | bright, clear | 0.05 | 0.04 |
| 28 | C | 0 | brown, cloudy | 0.6 | 0.33 |
| 29 | C | 0.5 | yellow | 0.1 | 0.05 |
| 30 | C | 1 | yellow, clear | 0.05 | 0.04 |
| 31 | C | 2 | bright, clear | 0.05 | 0.02 |
| 32 | D | 0 | yellow, cloudy | 0.1 | 0.05 |
| 33 | D | 0.05 | bright, clear | 0.05 | 0.01 |
| 34 | D | 1 | " | n.d. | n.d. |
| 35 | D | 2 | " | n.d. | n.d. |

TABLE V

| Test | Stabilizer, % | Appearance of the mixture | Cleavage products % of C$_2$HCl$_2$F$_3$ | % of HCl |
|---|---|---|---|---|
| 36 | 0 | brown, pasty | 3.9 | 1.6 |
| 37 | 0.05 | " | n.d. | n.d. |
| 38 | 0.25 | brown, clear | 0.3 | 0.15 |
| 39 | 0.5 | yellow, clear | n.d. | 0.08 |
| 40 | 1 | " | 0.1 | 0.06 |
| 41 | 3 | bright, clear | 0.05 | 0.02 |
| 42 | 5 | " | 0.05 | 0.02 |

TABLE VI

| Test | Storage time, days | Stabilizer, 1% on CCl$_3$F | Appearance of the mixture | Cleavage products % of CHCl$_2$F | % of HCl |
|---|---|---|---|---|---|
| 43 | 1 | none | bright, clear | n.d. | n.d. |
|  | 60 | " | brown, clear | 0.3 | 0.20 |
|  | 120 | " | brown, clear | 0.7 | 0.45 |
| 44 | 1 | 2,4-Diphenyl-4-methylpentene | bright, clear | n.d. | n.d. |
|  | 60 | 2,4-Diphenyl-4-methylpentene | bright, clear | 0.05 | 0.02 |

TABLE VI-continued

| Test | Storage time, days | Stabilizer, 1% on CCl$_3$F | Appearance of the mixture | Cleavage products % of CHCl$_2$F | % of HCl |
|---|---|---|---|---|---|
| | 120 | 2,4-Diphenyl-4-methyl-pentene | bright, clear | 0.05 | 0.03 |
| | 180 | 2,4-Diphenyl-4-methyl-pentene | yellow, clear | 0.1 | 0.05 |

We claim:

1. A process for stabilizing mixtures containing an amine having a primary or secondary aliphatic hydroxyl group, and also a customary quantity of trichlorotrifluoroethane and/or trichlorofluoromethane as a blowing agent, against premature reaction of components, by incorporating into the mixture from 0.05 to 5% by weight of 2,4-diphenyl-4-methylpentene in which the ratio of the 2,4-diphenyl-4-methyl-1-pentene isomer to the 2,4-diphenyl-4-methyl-2-pentene isomer is 1:1 to 9:1, the percentages relating to the chlorofluoroalkane.

2. A process for stabilizing mixtures containing an amine having a primary or secondary aliphatic hydroxyl group, and also a customary quantity of trichlorotrifluoroethane and/or trichlorofluoromethane as a blowing agent, against premature reaction of components, by incorporating into the mixture from 0.1 to 5% by weight of a mixture of stabilizers composed of 45 to 89% by weight of 2,4-diphenyl-4-methyl-1-pentene, 10 to 45% by weight of 2,4-diphenyl-4-methyl-2-pentene and 1 to 20% by weight of 1,1,3-trimethyl-3-phenylindane, the percentages relating to the chlorofluoroalkane.

3. An process as claimed in claim 1 or 2, wherein the mixture contains an amine having several primary or secondary aliphatic hydroxyl groups.

4. A process for stabilizing a mixture against premature reaction of components of the mixture by incorporating into the mixture from 0.05 to 5% by weight of 2,4-diphenyl-4-methylpentene, the percentages relating to chlorofluoroalkane, said mixture containing an amine having a primary or secondary aliphatic hydroxyl group and also a customary quantity of trichlorotrifluoroethane and/or trichlorofluoromethane as blowing agent, this mixture being reactive with a polyisocyanate to give a polyurethane foam.

5. A process according to claim 4 which comprises incorporating into the mixture from 0.05 to 0.5% by weight of 2,4-diphenyl-4-methylpentene, the percentage relating to the chlorofluoroalkane.

6. A process according to claim 4 wherein the 2,4-diphenyl-4-methylpentene is a mixture of isomers in which the ratio of the 2,4-diphenyl-4-methyl-1-pentene isomer to the 2,4-diphenyl-4-methyl-2-pentene isomer is 1:1 to 9:1.

7. A process according to claim 4 wherein the 2,4-diphenyl-4-methylpentene is part of a mixture of stabilizers composed of 45 to 89% by weight of 2,4-diphenyl-4-methyl-1-pentene, 10 to 45% by weight of 2,4-diphenyl-4-methyl-2-pentene and 1 to 20% by weight of 1,1,3-trimethyl-3-phenylindane, this entire mixture comprising from 0.1 to 5% by weight based on the chlorofluoroalkane.

* * * * *